United States Patent [19]
Mohammed

[11] 3,821,432
[45] June 28, 1974

[54] BLAND AMINO ACID COMPOSITIONS
[75] Inventor: Kasheed Mohammed, East Brunswick, N.J.
[73] Assignee: Johnson & Johnson, New Brunswick, N.J.
[22] Filed: July 26, 1971
[21] Appl. No.: 166,294

[52] U.S. Cl............... 426/167, 426/190, 426/212, 426/218, 426/223, 426/364
[51] Int. Cl. ............................................ A23j 1/30
[58] Field of Search ......... 99/98, 140 R, 14, 17, 28, 99/139; 426/218, 212, 223, 190, 167, 364

[56] References Cited
UNITED STATES PATENTS
3,689,288  9/1972  Duren................................ 99/139
3,697,287  10/1972  Winitz................................ 99/28

FOREIGN PATENTS OR APPLICATIONS
605,306  9/1960  Canada................................ 99/28

OTHER PUBLICATIONS
Furia et al., Handbook of Food Additives, The Chemical Rubber Co., (1968), pp. 479, 480.

Chem. Abstracts, Vol. 71, 1969, p. 215, 100459r.

Primary Examiner—A. Louis Monacell
Assistant Examiner—Thomas G. Wiseman
Attorney, Agent, or Firm—Jason Lipow

[57] ABSTRACT

A dietary composition for supplying nitrogen nutrition is provided comprising at least one individual amino acid and an effective quantity of oil of ginger sufficient to reduce the particularly intense and obnoxious taste of the amino acids when dispersed in water. The oil of ginger uniquely interacts organoleptically to reduce the amino acid intensity without itself producing an intense ginger flavor note. The composition is suitable for being dispersed in water to obtain a beverage or may be combined with thickening agents and dispersed in water to obtain a dietary pudding. In a preferred embodiment, other nutrients such as carbohydrates, fats, vitamins and edible mineral sources are added to produce a nutritionally complete dietary composition and moderate quantities of nonginger flavoring material are added to produce an organoleptically pleasing food product.

20 Claims, No Drawings

BLAND AMINO ACID COMPOSITIONS

BACKGROUND OF THE INVENTION

This invention concerns dietary compositions comprising amino acids and, in particular, concerns such dietary compositions wherein the strong, unpleasant taste of the amino acids is rendered bland.

Compositions comprising one or more pure amino acids have been administered parenterally, rectally and orally to provide low residue nitrogen nutritional requirements while simultaneously resulting in decreased digestive activity. Such properties are particularly useful in treating patients whose normal digestive processes are impaired as, for example, patients in catabolic disease states such as duodenal fistula, the short gut syndrome, pancreatitis, ulcerative colitis and the like. The compositions are also useful in providing nitrogen nutrition to pre- and post-operative patients when it is desired to limit their digestive activities.

A drawback heretofore associated with the oral administration of such compositions is that amino acids exhibit a particularly intense obnoxious taste and can, in fact, be orally ingested only with great psychological stress. Prior attempts at solving this problem have involved adding to these compositions various flavoring materials in large quantities whereby they exhibit an intense flavor note of their own sufficient to overwhelm that of the amino acids. In the main, only a few flavors have produced an intensely flavored composition which is less objectionable than the unflavored amino acid compositions and, in these few cases, the intense substituted flavor note has, without exception, been found to be organoleptically oppressive. This problem is particularly acute when a patient must subsist for an extended length of time on such dietary compositions Further, the heavily flavored compositions have caused secondary dietary problems such as diarrhea and nausea and, still further, because these flavoring materials are costly, the necessity of using them in large quantities has greatly increased the expense of dietary regimens for supplying nitrogen nutrition in this manner. There is, therefore, a need for reducing the intense and obnoxious amino acid flavor note without utilizing great quantities of a substitute flavoring material.

SUMMARY OF THE INVENTION

In accordance with this invention, a dietary composition for supplying nitrogen nutrition is provided comprising at least one individual amino acid and an effective quantity of oil of ginger sufficient to reduce the amino acid flavor intensity when said composition is dispersed in water. The composition is in the form of powdered, crystalline particles of at least one individual amino acid blended preferably with a dry, free-flowing form of oil of ginger, the oil being present in a ratio of at least about 0.04 milligrams of oil of ginger per gram of the total amount of amino acids. As such, the composition is suitable for use in a variety of forms of finished products such as a beverage, for example, which may be obtained by dispersing the composition in water or a pudding obtained by adding to the composition a suitable gelling or thickening agent and water.

It has been discovered that oil of ginger present in the quantities herein prescribed will organoleptically interact with the amino acids in the finished product to greatly reduce the obnoxious taste intensity of the amino acids without itself producing a strong objectionable ginger taste. Unlike past attempts to mask the unwanted amino acid taste by adding thereto large quantities of flavoring material which will superimpose a more acceptable but organoleptically oppressive flavor, the ginger acts to neutralize the taste of the amino acids and thereby render the resulting product relatively bland without contributing a high intensity flavor note of its own. In preferred embodiments, the taste-neutralized composition is flavored with moderate quantities of natural or artificial flavoring materials such as the oils of fruits and berries, meat flavorings, vegetable flavorings and various other flavorings such as vanilla, chocolate, butterscotch, etc., to provide an organoleptically pleasing dietary composition. In still another embodiment, the composition further comprises additional nutrients such as fat, carbohydrates, vitamins and minerals to provide a nutritionally complete food product.

DETAILED DESCRIPTION OF THE PREFERRED EMBODIMENTS

The Amino Acid Component

The amino acids used in the dietary compositions of the invention comprise one or more pure, individual amino acids, either in the levorotatory form or in mixtures of both the levorotatory and the dextrorotatory form. A part or all of the amino acid portion may be in the form of the free base or in the form of the alkyl esters, hydrochlorides, hydrates or combinations thereof, these all being available as white crystalline powders.

The term "individual amino acids" means those hydrocarbons possessing at least one amino and at least one carboxylic acid group, generally having the structure $NH_2RCHCO_2H$, where the side chain R may be of diverse composition and structure. Encompassed within this definition are the aliphatic amino acids including the monoaminomonocarboxylic amino acids such as glycine, alanine, isoleucine, leucine and valine; the hydroxymonoaminomonocarboxylic amino acids such as serine and threonine; the monoaminodicarboxylic amino acids such as aspartic acid and glutamic acid; the monoaminodicarboxylic-W-amides such as asparagine and glutamine; the diaminomonocarboxylic amino acids such as arginine, lysine, and 5-hydroxylysine; and the sulfur-containing amino acids such as cysteine, cystine and methionine. Also encompassed by this term are the aromatic amino acids such as phenylalanine and tyrosine and the heterocyclic amino acids such as tryptophan, histidine, proline, and 4-hydroxyproline. Excluded from the definition of individual amino acids are the polyamino acids such as proteins and peptides although these may also be included in the compositions of this invention.

Preferably, the amino acid portion supplies the entire nutritional nitrogen requirements of the user and, accordingly, includes the nutritional equivalent of at least the eight so-called indispensable amino acids, present in proportions so as to supply at least their respective daily minimum requirements, as reported by Rose et al., Journal of Biological Chemistry, 217, 997 (1955) and listed below in Table 1.

Table 1

| Amino Acid | Minimum Daily Requirement (gm./day) |
| --- | --- |
| l-valine | 0.80 |
| l-leucine | 1.10 |
| l-isoleucine | 0.70 |
| l-threonine | 0.50 |
| l-methionine | 1.10 |
| l-phenylalanine | 1.10 |
| l-tryptophan | 0.25 |
| l-lysine | 0.80 |

In addition to these eight indispensable amino acids, others may be provided and, in some instances, are necessary for complete nitrogen nutritional adequacy, depending on age, state of health and on the existence or absence of such factors as pregnancy, lactation or malnutrition. Such additional amino acids (hereinafter termed "dispensable") include, for example, tyrosine, alanine, aspartic acid, glutamine, proline, serine, arginine, histidine and cystein in either or both of their optically active forms and the dextrorototary counterparts of the above-listed indispensable amino acids. The proportions of dispensable to indispensable amino acids can range from a ratio of about 0.0 to about 1.5 and, preferably, range from about 0.6 to about 1.5.

The Ginger Component

In accordance with this invention, small quantities of the oil of ginger are used to reduce the flavor intensity of water dispersions of the above-described amino acids. While ginger, in various forms, has heretofore been used as a spice to give pungency to a variety of food products, it has now been discovered that oil of ginger may be used as an agent for rendering water dispersions of amino acid compositions relatively bland without introducing a pungent, high intensity ginger flavor note. Accordingly, by providing a composition comprising amino acids and the quantities of oil of ginger herein prescribed, the resulting composition, now exhibiting a low amino acid taste intensity in water, may be flavored with only moderate quantities of a wide variety of flavoring materials as, for example, citrus flavors such as grapefruit, orange, lemon and lime; other fruit and berry flavors such as cherry, pineapple; vanilla flavors; beef flavors; or others.

Oil of ginger, a yellowish, viscid, volatile oil, sparingly soluble in alcohol and almost completely insoluble in water, is derived from the rhizome, i.e., the underground stem, of the root stock of Zingiber Officinale Roscoe, known commercially as ginger root. The plant is commercially cultivated in the West Indies, India, Africa, China, Japan and the East Indies, the chief source being Jamaica and India. The oil, usually obtained by the water and stem distillation of the dried, freshly ground rhizomes, comprises a mixture of sesquiterpenoids, monoterpenoids and associated compounds, the major constituent being the sesquiterpenoid, zingiberene. Other sesquiterpenoids generally present are ar-curcumene, bisabolene, farnesene, silenene, elemene, and sesquiphellandrene. Such monoterpene hydrocarbons as camphene, phellandrene, pinene, myrcene, p-cymene, limonene, and cumene have been identified. The presence of such oxygenated monoterpenes and associated compounds such as mononal, deconal, methylheptanone, cireole, borneol, linalol, geranial, citral and heptanol has also been indicated.

While it is preferred that the ginger component prescribed herein be provided in the form of pure oil of ginger, other ginger forms which contain substantial quantities of this oil, such as the commonly available oleoresin of ginger, may be used. The oleoresin is an extract of dried ground ginger using a solvent such as acetone, ethanol or diethyl ether. The extract is usually concentrated under vacuum to yield the oleoresin as a dark brown, pungent, viscous oil, the constituents of which are generally analytically divided into the classes of the pungent principles, the nonpungent substances and the essential oils, this latter class comprising from between 7 to 30 percent by weight of the oleoresin. While both the oil and the oleoresin are available in many physical forms, it is preferred that one of the dry, free-flowing forms be utilized in connection with this invention, thereby facilitating the blending of the ginger into the dry particulate amino acids and other dietary components. Such dry, free-flowing ginger oil is readily obtainable and results from several well-known processes such as, for example, freeze-drying, spray-drying and liquid microencapsulation.

In accordance with this invention, it has now been discovered that, for reasons not yet clearly understood, the amino acid and ginger components interact organoleptically in the finished product to reduce the extremely unpleasant flavor intensity of the amino acids. Surprisingly, this highly advantageous result occurs at such low proportions of the ginger component that the presence of the prescribed quantities of ginger in the finished beverage or pudding is generally unevidenced, except by the desired reduction in the unwanted amino acid flavor note. In fact, the effective quantity of ginger is so low that, for example, its presence in a beverage prepared without amino acids is only slightly evidenced. This result is unexpected in that, as noted above, it has heretofore been necessary to provide an extremely intense substitute flavor to overcome the amino acid taste which, while preferable over the obnoxious amino acid flavor note, would become organoleptically oppressive. In contrast to the prior method of overwhelming the amino acid flavor note with a more preferable but oppressively intense flavor, the ginger of this present invention acts to neutralize the amino acid flavor note and lower the flavor intensity of the finished product, i.e., render the product relatively bland. No organoleptical interaction has been detected between ginger and other nutritional components such as, for example, vitamins, minerals or carbohydrates, and it therefore appears that the results obtained in accordance with this invention are specific to amino acids.

While the interaction between the amino acids and ginger occurs over a substantial range of relative proportions of oil of ginger to amino acids, it has further been determined that the most effective suppression of unwanted flavor notes occurs at ratios within the specific range of about 0.04 to about 1.2 milligrams of oil of ginger per gram of amino acids. Within this range the combined intensity of the unwanted flavor notes of both components is minimized. By reducing the intensity of these flavor notes to a minimum, the composition need be flavored with only moderate quantities of various flavorings to produce an aesthetically pleasing dietary composition.

It should be noted in this connection that the lower prescribed limitation on the quantity of ginger corresponds to that level at which the majority of tasters have reported that the amino acids are reduced to an acceptable intensity level. Should the sensitivity to the taste of amino acids be lower in a particular user, it may be possible to utilize a still lower quantity of ginger. Similarly, the upper limit on the quantity of ginger is based on that level beyond which the flavor note of ginger becomes substantially evidenced, as reported by a majority of tasters. Again, should a specific user be less sensitive to the ginger flavor or should a ginger flavor note be desirable in a particular instance, as for example when preparing a ginger-flavored beverage, then the upper limit could be exceeded.

It is contemplated that the compositions of this invention will be used to supply basic nutrition to its users and, accordingly, nutrients other than amino acids may be incorporated therein such as carbohydrates, fats, vitamins and minerals.

In general, when the composition is to supply all the basic nutritional needs of an adult user, the total caloric value of the non-amino acid nutrients should be sufficient to provide a daily caloric intake of about 1,000 to about 8,000 kilocalories, a specific value within this range depending upon such factors as the state of health or the activity of the user. Relatively nonactive users such as non-ambulatory patients may be supplied with a lesser amount of caloric material such as, for example, about 1,000 to about 2,000 kilocalories per day, whereas active users may require from about 2,000 to about 8,000 kilocalories per day.

It should be understood that substantially all of the non-amino acid derived caloric value is derived from carbohydrates and fats with a minor portion derived from flavoring materials and an essentially negligible portion derived from vitamins and minerals. The carbohydrates may be, for example, sugars, starches or combinations thereof such as are obtained upon the hydrolysis of starches. The fats may include natural fat components such as vegetable oils, or, alternatively or in combination, fat in a chemically defined form, such as esters of fatty acids. The vitamins may include, for example, Vitamin A, Vitamin D, Vitamin $B_{12}$, Vitamin C, dl-alpha tocopherol, p-amino benzoic acid or its salts, pantothenic acid or its salts, choline or its salts, folic acid, inositol, niacinamide, riboflavin, pyridoxine and thiamine. In general, when supplying the total vitamin intake of a user with the compositions of this invention, about 10 to about 100 milligrams of vitamins per gram of amino acids should be included. The minerals may include edible sources of sodium, potassium, calcium, magnesium, manganese, copper, zinc, iron and iodine. Minerals, when supplied with the compositions of this diet as the sole source of mineral nutrition, should be present in the ratio of about 0.3 grams of minerals per gram of amino acids to about 2.4 grams per gram.

The compositions are best administered orally by dispersing them in a suitable quantity of a diluent such as water. Generally, an amino acid concentration may range from very dilute dispersions to concentrations as high as about 450 grams of amino acids per liter of water. Extreme dilution is limited by such factors as the undesirability of feeding large quantities of diluent to a user or the inconvenience of requiring large volumes of the dispersion to be administered in order to supply sufficient quantities of amino acids. Preferably, no less than about 10.0 grams of amino acid per liter of water is used.

At amino acid concentrations of up to about 250 grams per 1000 milliliters, a well-dispersed beverage results. When it is desired to produce a pudding or at the higher amino acid concentrations where dispersion is difficult, a suitable gelling or thickening agent, such as, for example, corn syrup solids, agar agar, locust bean gum, xanthangum, gum acacia, or gum tragacanth, may be added. By incorporating these agents into the composition in quantities of the order of about 25 to about 100 grams of agent per liter of water, a pudding-like dietary composition results.

The compositions of this invention may be prepared by blending the various components in conventional dry solids blending equipment and may be packaged for later dispersal in water in various portion-sized packages and containers or in bulk. Alternatively, a predispersed composition may be produced and packaged.

The invention is further illustrated by the following examples:

EXAMPLE 1

Four sample solutions are prepared using tap water and containing the components and proportions tabulated below:

| Sample | Oil of Ginger (mg/1000 ml water on a carrier-free basis) | Component Amino Acids (gm/1000 ml water) | Ratio (mg oil of ginger/gm amino acids) |
|---|---|---|---|
| 1 | 0.0 | 0.0 | — |
| 2 | 4.24 | 0.0 | — |
| 3 | 0.0 | 25.5 | 0.0 |
| 4 | 4.24 | 25.5 | 0.166 |

The ginger component is a spray-dried form of oil of ginger on an inert carrier wherein 20 per cent by weight is the oil and is obtained from the Fritzche/D&O Company, New York, and sold by them under the trademark Aromalok, Ginger 40664.

The amino acid component is a mixture of individual amino acids and alkyl esters, hydrochlorides and hydrates of individual amino acids which, when provided in sufficient quantities to a human, will supply his complete nitrogen nutritional requirements. The mixture, having a ratio of dispensable to indispensable amino acids of 0.667, has the following composition, in the following proportions;

| Component | Parts by Weight |
|---|---|
| l-isoleucine | 3.69 |
| l-leucine | 4.79 |
| l-lysine monohydrochloride | 4.56 |
| l-phenylalanine | 2.69 |
| dl-methionine | 2.73 |
| l-threonine | 2.36 |
| l-tryptophan | 0.64 |
| l-valine | 3.46 |
| l-tyrosine ethyl ester monohydrochloride | 2.55 |
| l-arginine monohydrochloride | 4.43 |
| l-histidine monohydrochloride | 1.13 |
| l-alanine | 0.58 |
| l-aspartic acid | 1.96 |
| l-glutamine | 5.03 |
| l-proline | 0.99 |
| l-serine | 1.24 |

A panel of qualified judges, in a blind test, were asked to appraise these samples organoleptically with respect to both the intensity of the ginger flavor note and the intensity of the amino acid flavor note. 90 per cent of the judges correctly responded to sample 1 which contained only water by reporting no ginger or amino acid flavor note at all.

60 per cent of the judges reported that sample 2, containing only ginger and water, exhibited only a slight ginger flavor note. 30 per cent reported this sample as having a moderate ginger flavor intensity. Only 10 per cent reported a distinct ginger flavor note. The uncertainty in detecting a ginger flavor note in this sample is further indicated by the fact that 30 per cent of the judges reported that the sample exhibited a slight amino acid flavor note, whereas in fact no amino acid was present.

In contrast with the judges' difficulty in identifying a distinct ginger note in sample 2, sample 3, containing only amino acids, received a response of at least a strong amino acid flavor intensity from ninety per cent of the judges. 60 per cent characterized the amino acid intensity as extreme.

When presented with sample 4, the sample containing both the amino acids and the ginger, ninety per cent of the judges reported a distinct decrease in the intensity of the amino acid flavor note relative to that of sample 3.

Example 1 clearly indicates that, in accordance with the teachings of this invention, a quantity of ginger which is so low as to generally exhibit only a very slight flavor note of its own, will depress the strong flavor note of the amino acids.

To illustrate that the organoleptical interaction described above appears to be unique to amino acids, the following examples are given:

EXAMPLE 2

Three sample solutions were prepared, the first sample containing 220 grams of the carbohydrates Maltodextrin and Dextrose, in aproximately a 1:1 ratio by weight, per 1,000 milliliters of water. The second sample contained the same concentration of the carbohydrate mixture and also contained 1.15 milligrams of oil of ginger per 1000 milliliters or water, the oil of ginger component provided by the addition of the spray-dried ginger described in the foregoing example. The third sample contained the same concentration of the carbohydrate mixture and an oil of ginger concentration of 4.24 milligrams of the above-described oil of ginger per 1,000 milliliters of water. The three samples were submitted to a taste panel of competent judges who were asked to evaluate each sample in decreasing level of preference, on a scale of 1 to 3. Where judges could mot differentiate between samples as to level of preference, they were permitted to assign the same value to different samples and, accordingly, the percentage of votes cast for a given sample could total to more or less than 100 per cent of the judges voting. 40 per cent of the judges assigned to the solution containing no ginger a high preference rating of 1. Only 20 per cent of the judges assigned this rating to the solution containing the low quantity of ginger, and sixty per cent assigned the high preference rating to the solution containing the high quantity of ginger. These results indicate no meaningful preference for ginger-containing carbohydrate solutions versus nonginger-containing carbohydrate solutions.

EXAMPLE 3

A second set of three sample solutions was prepared, the first sample containing 0.76 grams of a vitamin blend per 1,000 milliliters of water. The vitamin blend contained the following components in the proportions tabulated below:

| Vitamin | Parts by Weight |
|---|---|
| Vitamin A | $2.27 \times 10^{-2}$ |
| Vitamin $D_2$ | $2.30 \times 10^{-3}$ |
| Vitamin $B_{12}$ | $0.60 \times 10^{-3}$ |
| Ascorbic Acid USP | $1.40 \times 10^{-1}$ |
| dl-alpha Tocopherol Acetate | $1.10 \times 10^{-1}$ |
| p-Amino Benzoic Acid, Potassium Salt | $3.90 \times 10^{-1}$ |
| d-Biotin | $2.00 \times 10^{-4}$ |
| Calcium Pantothenate | $1.15 \times 10^{-2}$ |
| Choline Bitartrate | $4.47 \times 10^{-1}$ |
| Folic Acid | $1.00 \times 10^{-4}$ |
| Inositol NF | $1.28 \times 10^{-1}$ |
| Niacinamide USP | $1.87 \times 10^{-2}$ |
| Riboflavin USP | $1.80 \times 10^{-3}$ |
| Pyridoxine Monohydrochloride | $2.60 \times 10^{-3}$ |
| Thiamine Mononitrate USP | $1.40 \times 10^{-3}$ |

The second sample contained the same concentration of the vitamin blend and, in addition, contained 1.15 milligrams per milliliter of water of the same oil of ginger as used in the preceding example. The third sample contained the same concentration of the vitamin blend and an oil of ginger concentration of 4.24 milligrams of oil of ginger per 1,000 milliliters of water. The three samples were submitted to the taste panel and, again, the judges were asked to evaluate each sample in order of decreasing level of preference on a scale of 1 to 3. Sixty per cent of the judges assigned to the solution containing no ginger a high preference rating of 1. Forty per cent of the judges assigned this rating to the solution containing the low quantity of ginger, and forty per cent assigned the high preference rating to the solution containing the high quantity of ginger. Again, these results indicate no meaningful preference for ginger-containing vitamin solutions versus nongingercontaining vitamin solutions.

EXAMPLE 4

A third set of three sample solutions was prepared containing 15.5 grams of an edible mineral blend per 1000 milliliters of water. The mineral blend contained the components in the proportions tabulated below:

| Mineral | Parts by Weight |
|---|---|
| Sodium biphosphate, monobasic | 5.45 |
| Potassium chloride, anhydrous | 3.12 |
| Calcium acetate·$H_2O$ | $2.19 \times 10^{-2}$ |
| Calcium gluconate | $1.33 \times 10$ |
| Manganese gluconate | 3.24 |
| Manganese gluconate·$3H_2O$ | $2.55 \times 10^{-2}$ |
| Cupric gluconate NF | $1.39 \times 10^{-2}$ |
| Zinc sulfate·$H_2O$ | $0.97 \times 10^{-3}$ |
| Potassium iodide anhydrous | $1.79 \times 10^{-4}$ |
| Ferrous ammonium sulfate·$6H_2O$ | $6.82 \times 10^{-1}$ |

The second sample contained the same concentration of the mineral blend and, in addition, contained 1.15 milligrams of oil of ginger per 1000 milliliters of water. The third sample contained the same concentration of the mineral blend and an oil of ginger concentration of 4.24 milligrams of oil of ginger per 1000 milliliters of water. The three samples were again submitted to the taste panel and evaluated in accordance with Examples 2 and 3. 40 per cent of the judges assigned the highest preference rating of 1 to the solution containing no ginger. 20 per cent assigned this preference rating to the solution containing low quantities of ginger, and 60 per cent assigned this preference rating to the solution containing the high quantity of ginger. Once more, these results indicate no meaningful preference for the ginger-containing mineral blend versus the mineral blend containing no ginger.

EXAMPLE 5

A further set of three sample solutions was prepared, the first sample containing 25.5 grams of an amino acid blend per 1000 milliliters of water, the amino acid blend having the components in the proportions present in the mixture of amino acids described in Example 1. The second sample contained the same concentration of amino acids and, in addition, contained 1.15 milligrams of oil of ginger per 1000 milliliters of water. The third sample contained the same concentration of amino acids and, in addition, contained an oil of ginger concentration of 4.24 milligrams of oil of ginger per 1000 milliliters of water. When submitted to the the same panel of judges for preference evaluation, 10 per cent of the judges assigned a rating of 1 to the amino acid solution containing no ginger. 10 per cent of the judges assigned this rating to the amino acid solution containing the low levels of ginger. Surprisingly, sixty per cent of the judges assigned the highest preference rating of 1 to the amino acid solution containing the high level of ginger, indicating a clear preference for ginger-containing amino acid solutions over nonginger-containing amino acid solutions.

Examples 2 through 5 illustrate that ginger apparently does not interact organoleptically with such nutritional components as vitamin, mineral and carbohydrate solutions whereas, in some unique way not yet understood, ginger has improved the preference rating of a ginger-containing amino acid solution.

To illustrate the relationship between the oil of ginger concentration in ginger/amino acid beverages and the organoleptical response to these beverages, the following example is given:

EXAMPLE 6

Four beverages are prepared, each containing the blend of amino acids described above in Example 1 and, in addition, the oil of ginger used in Example 1, in quantities tabulated in Table 1 below. A panel of competent judges was asked to evaluate the samples of the beverages based on the relative intensities of both the ginger and the amino acid flavor notes, the evaluation to be based on a scale ranging from extreme to moderate to none. The results of this panel evaluation are also tabulated in Table 1.

Table 1

| Sample No. | Oil of Ginger Conc. (mg ginger/gm amino acid) | % of Judges Rating Intensity Greater than Moderate | |
|---|---|---|---|
| | | Amino Acid Flavor Note | Ginger Flavor Note |
| 1 | 0.0 | 60.0 | 0 |
| 2 | 0.332 | 10.0 | 0 |
| 3 | 0.830 | 0.0 | 0 |
| 4 | 1.33 | 0.0 | 80 |

It is apparent from the above table that the majority of the judges could detect a more-than-moderate amino acid intensity for Sample 1, containing no ginger. In the subsequent samples of increasing ginger concentration, all but a small minority of the judges evaluated the taste intensity of the amino acid flavor note as no more than moderate, the judges lacking unanimity only in rating the sample containing the least amount of ginger, and in that case only 10 percent of the judges rated the amino acid intensity as greater than moderate.

In contrast to the evaluation of these samples on the basis of amino acid intensity, when the panel rated the same samples on the basis of ginger intensity it was only Sample 4, containing a substantial quantity of ginger, which failed to get a unanimous rating of moderate or less. Accordingly, at the preferred range of about 0.04 to about 1.0 milligrams of oil of ginger per gram of amino acids, a relatively bland solution is obtained wherein essentially all the judges agreed that the intensity of both the amino acid and the ginger flavor notes were moderate or less.

EXAMPLE 7

A dietary composition suitable for producing a nutritional beverage was prepared comprising an amino acid portion, a carbohydrate portion, a vitamin portion and a mineral portion having the components in the proportions described above in Examples 1 through 4, respectively. A fat portion consisting of safflower oil, is also included. The relative quantities of each of these portions are tabulated below and are in the proportions required to supply a normal adult human male with his total daily nutritional requirements.

| Portion | Parts by Weight |
|---|---|
| Amino Acids | 42.82 |
| Carbohydrates | 374.95 |
| Vitamins | 1.28 |
| Minerals | 26.13 |
| Fat | 1.60 |

This mixture was then combined with a flavoring material containing: (1) 24 parts by weight of grapefruit flavoring material obtained from the Sunkist Corporation of Calif. and sold under the trademark of PERMASTABIL, and (2) 5 parts by weight of malic acid. In addition, 0.05 parts by weight of a ginger ale flavoring material obtained from Green & Green, Incorporated, of Houston, Texas, and sold under the trademark DRILOK, were added. This flavoring material is in the form of liquid, encapsulated in a water-soluble starch and hence readily combined with the other dry, particulate dietary components. The ginger ale flavoring material comprises 3.8 percent by weight of oil of ginger derived from both the oleoresin and from the free oil, and hence in the above-prescribed proportions the ratio of oil of ginger to amino acids was 0.0444 mg/gm.

A first nutritional beverage was prepared from the above flavored mixture by dispersing the mixture in water to a dilution of 286 grams of mixture per 1,000 milliliters of water.

A second nutritional beverage was prepared from a mixture identical to that used above with the exception that no ginger ale flavoring material was added.

The two beverages were submitted to a taste panel of qualified judges who were asked, in a blind test, to evaluate the samples as to taste preference. Eighty per cent of the judges preferred the ginger-containing sample.

EXAMPLE 8

A dietary composition was prepared as described in the foregoing example with the exception that the flavoring material contained:
1. 4 parts by weight of pineapple flavoring material obtained from the Sunkist Corporation of Calif. and sold under the trademark PERMASTABIL;
2. 1.6 parts by weight of orange flavoring material obtained from the above corporation and sold under the same trademark;
3. 0.8 parts by weight of tangerine flavoring material obtained from the above corporation and sold under the same trademark;
4. 4 parts by weight of malic acid.

In addition, 0.2 parts by weight of the ginger ale flavoring used in the prior example were added, this quantity corresponding to an oil of ginger to amino acid ratio of 0.177 mg/gm. A first nutritional beverage was prepared by dispersing the above mixture in water to a dilution of 286 gm/1000 ml of water.

Second and third beverages were prepared by dispersing a flavored dietary composition mixture in water to the same dilution as above. The mixtures were each identical to that above described with the exception that only 0.1 parts by weight of the ginger ale flavor was added to the second mixture, resulting in an oil of ginger to amino acid ratio of 0.0885 mg/gm and no ginger ale flavor was added to the third mixture.

The three beverages were submitted to a taste panel of qualified judges who were asked, in a blind test, to evaluate the beverages as to prefence. Eighty-five per cent of the judges preferred either of the two ginger-flavored beverages to the nonginger-flavored beverage. Surprisingly, 25 per cent of the judges preferred the beverage flavored with the lower quantity of ginger, 25 per cent of the judges preferred the beverage flavored with the higher quantity of ginger, and 35 per cent of the judges could not distinguish between these two beverages as to preference. These results again indicate that, while small quantities of oil of ginger are sufficient to interact with the amino acids to produce a significant difference between ginger-containing and nonginger-containing mixtures, the quantities of ginger are so low that no substantial difference is detected in the finished beverage between mixtures containing substantially different quantities of ginger, i.e., the ginger itself does not produce a substantial flavor note of its own in the quantities herein prescribed.

EXAMPLE 9

A dietary composition was prepared using the proportions of amino acids, fat, carbohydrates, minerals and vitamins as described in Example 8. To the mixture were added the following flavoring material and dispersing agents:

FLAVORING MATERIAL 1. 8.0 parts by weight of lemon-lime flavoring materials obtained from the Sunkist Corporation of California and sold under the trademark PERMASTABIL.
2. 1.6 parts by weight of pineapple obtained from the above corporation and sold under the same trademark.
3. 1.6 parts by weight malic acid.

Dispersing Agents 1. 1.08 parts by weight Xanthan gum.
2. 0.034 parts by weight Locust bean gum.
3. 40.0 parts by weight starch.

In addition, 0.05 parts by weight of the ginger ale flavoring used in the prior example was added corresponding to an oil of ginger to amino acid ratio of 0.45 mg/gm.

A pudding was prepared by dispersing the dietary composition with water in a dilution ratio of 88 grams of amino acids per 1,000 liters of water.

A second pudding was prepared using the components and proportions as described above with the exception that no ginger ale flavoring was added.

The two puddings were submitted to a taste panel of qualified judges who were asked, in a blind test, to evaluate the two samples as to taste preference. Seventy per cent of the judges preferred the ginger-containing sample.

While the invention has been described above in connection with specific examples and embodiments, it will be understood by those skilled in the art that variations and modifications of these specific examples and descriptions may be employed without departing from the scope of the invention as defined in the appended claims.

What is claimed is:

1. A dietary composition for supplying nitrogen nutrition comprising at least one individual amino acid having an unpleasant flavor and from about 0.04 milligrams to about 1.20 milligrams of oil of ginger per gram of amino acid to reduce the amino acid flavor intensity when said composition is dispersed in water.

2. The composition of claim 1 wherein the oil of ginger is in the dry, free-flowing form.

3. The composition of claim 2 wherein the oil of ginger is in the freeze-dried form.

4. The composition of claim 2 wherein the oil of ginger is in the spray-dried form.

5. The composition of claim 2 wherein the oil of ginger is in the form of encapsulated liquid.

6. The composition of claim 1 wherein the amino acids comprise the indispensable amino acids valine, leucine, isoleucine, threonine, methionine, phenylalanine, tryptophan, and lysine.

7. The composition of claim 6 wherein the amino acids comprise dispensable amino acids.

8. The composition of claim 7 wherein the amino acids comprise dispensable amino acids and indispensable amino acids present in the ratio of about 0 to about 1.5 grams of dispensable amino acids per grams of indispensable amino acids.

9. The composition of claim 7 wherein the amino acids comprise valine, leucine, isoleucine, threonine, methionine, phenylalanine, tryptophan, lysine, tyrosine, alanine, aspartic acid, glutamine, proline, serine, arginine, histidine and cystein.

10. The composition of claim 1 further comprising carbohydrates.

11. The composition of claim 1 further comprising edible fat.

12. The composition of claim 1 further comprising vitamins.

13. The composition of claim 1 further comprising edible minerals.

14. The composition of claim 1 further comprising nonginger flavoring materials.

15. A dietary beverage for supplying nitrogen nutrition comprising a water dispersion of at least one individual amino acid having an unpleasant flavor and from about 0.04 milligrams to about 1.20 milligrams of oil of ginger per gram of amino acid to reduce the amino acid flavor intensity of said beverage.

16. The beverage of claim 15 further comprising nonginger flavoring material.

17. A dietary pudding for supplying nitrogen nutrition comprising a water dispersion of at least one pure amino acid having an unpleasant flavor, an edible thickening agent, and from about 0.04 milligrams to about 1.20 milligrams of oil of ginger per gram of amino acid to reduce the amino acid flavor intensity of said pudding.

18. The pudding of claim 17 further comprising nonginger flavoring material.

19. A method of improving the palatability of water dispersions of amino acids which comprises providing, in intimate admixture with at least one amino acid having an unpleasant flavor, from about 0.04 milligrams to about 1.20 milligrams of oil of ginger per gram of amino acid to reduce the amino acid flavor intensity of said dispersions.

20. A method of supplying a human with a dietary composition comprising at least one individual amino acid having an unpleasant flavor comprising orally administering a water dispersion of said composition and from about 0.04 milligrams to about 1.20 milligrams of oil of ginger per gram of amino acid to reduce the amino acid flavor intensity of said dispersion.

* * * * *